United States Patent [19]

Dreer

[11] 4,110,281

[45] Aug. 29, 1978

[54] PROCESS FOR THE MANUFACTURE OF FILLERS FROM SOLID WASTE

[76] Inventor: Gottfried Dreer, Krawehlstrasse 34, 4300 Essen, Fed. Rep. of Germany

[21] Appl. No.: 777,431

[22] Filed: Mar. 14, 1977

Related U.S. Application Data

[63] Continuation-in-part of Ser. No. 674,431, Apr. 7, 1976, abandoned, and a continuation-in-part of Ser. No. 597,120, Jul. 18, 1975, abandoned, and a continuation-in-part of Ser. No. 593,386, Jul. 7, 1975, abandoned, and a continuation-in-part of Ser. No. 550,585, Feb. 18, 1975, Pat. No. 4,012,231.

[30] Foreign Application Priority Data

| Feb. 15, 1974 | [DE] | Fed. Rep. of Germany | 2407383 |
| Jul. 6, 1974 | [DE] | Fed. Rep. of Germany | 2432606 |
| Jul. 18, 1974 | [DE] | Fed. Rep. of Germany | 2434487 |
| Apr. 8, 1975 | [DE] | Fed. Rep. of Germany | 2515179 |

[51] Int. Cl.² ............... C04B 31/40; C09D 3/66; C09D 5/18
[52] U.S. Cl. .................. 260/22 A; 106/15 FP; 241/DIG. 38; 260/40 R; 264/330; 264/331; 428/2
[58] Field of Search ........... 260/22 A, 40 R; 428/2; 264/330, 331; 241/DIG. 38; 106/15 FP

[56] References Cited

U.S. PATENT DOCUMENTS

| 2,837,435 | 6/1958 | Miller et al. ............... 106/119 |
| 3,030,222 | 4/1962 | Eichenlaub ............... 106/309 |
| 3,189,568 | 6/1965 | Sparks et al. ............ 260/22 A |
| 3,383,228 | 5/1968 | Rekate et al. ............. 264/330 |
| 3,470,006 | 9/1969 | Brunel ...................... 106/123 |
| 3,594,439 | 7/1971 | Baker ....................... 260/22 CA |
| 3,654,048 | 4/1972 | Bathgate ................... 161/7 |
| 3,702,257 | 11/1971 | Koning ..................... 106/288 B |
| 3,721,183 | 3/1973 | Dunlea ..................... 241/DIG. 38 |
| 3,729,107 | 4/1973 | Present ..................... 214/152 |
| 3,736,120 | 5/1973 | Temple ..................... 241/DIG. 38 |
| 3,736,277 | 4/1971 | Bender ..................... 260/22 EP |
| 3,741,863 | 6/1973 | Brooks ...................... 428/2 |
| 3,850,771 | 11/1974 | Penque ...................... 264/330 |
| 3,876,157 | 4/1975 | McIntire et al. .......... 241/DIG. 38 |
| 3,892,706 | 7/1975 | Jetzer ........................ 260/39 R |
| 3,897,215 | 7/1975 | Davidson et al. ......... 241/DIG. 38 |
| 3,928,254 | 12/1975 | Takayama et al. ....... 260/40 R |
| 3,930,799 | 1/1976 | Eweson .................... 241/DIG. 38 |
| 3,931,094 | 1/1976 | Segal et al. ............... 260/40 R |
| 3,931,095 | 1/1976 | Kondo et al. ............. 260/40 R |
| 3,936,414 | 2/1976 | Wright et al. ............ 260/40 R |
| 3,991,005 | 11/1976 | Wallace .................... 428/2 |

FOREIGN PATENT DOCUMENTS

| 2,001,583 | 1/1970 | Fed. Rep. of Germany. |
| 1,405,587 | 9/1975 | United Kingdom ........ 428/2 |

*Primary Examiner*—Ronald W. Griffin
*Attorney, Agent, or Firm*—Burton, Parker & Schramm

[57] ABSTRACT

A process for producing a compost which comprises grounding municipal waste, magnetically freeing iron contained therein, separating said mixture into components of various sizes by fractionation and, treating said mixture in a fermentation process at a temperature of at least 65° C by continuously passing air thereto and mixing a solvent with said mixture and heating said vessel until the contents of the vessel are dried, thereby forming a compost.

15 Claims, No Drawings

PROCESS FOR THE MANUFACTURE OF FILLERS FROM SOLID WASTE

CROSS REFERENCE TO RELATED CASES

This case is a continuation in part of: U.S. Ser. No. 550,585, filed Feb. 18, 1975 now U.S. Pat No. 4,012,231, U.S. Ser. No. 593,386, filed July 7, 1975, now abandoned, U.S. Ser. No. 597,120, filed July 18, 1975, now abandoned, and U.S. Ser. No. 674,431, filed Apr. 7, 1976, now abandoned, all of which are hereby incorporated by reference.

BACKGROUND OF THE INVENTION

The invention concerns a process for the production of fillers from solid waste or municipal waste which for conversion into compost, is first ground, magnetically freed from iron particles, supplied with sewage sludge or water, fractionated or divided into portions of different size, and treated in a fermentation process conducted for a period of time, such as one day, at a temperature of about 65° C. while fresh air is continuously fed thereto.

The incorporation of ground solid particles into cement-like masses has been known for a long time, especially since many waste products of the customary industrial materials, for example, wood, rubber, glass, fibers produced in the textile industry, or the like can be worked into the composite cement systems. However, untreated household solid waste or the compost produced according to the above-mentioned method cannot be processed to yield molded articles of all types, such as slabs and walls for exterior and interior construction, floors, roofs, or the like since the many contaminants present in the solid waste or in the compost cause difficulties in the progress of the necessary polymerization process. These difficulties essentially consist in hindering or preventing molecular cross-linking and thus the hardening of the resins to form homogeneous, solid bodies.

SUMMARY OF THE INVENTION

The invention has as its object a process for manufacturing fillers from solid waste or municipal waste which produces fillers that can be incorporated into natural or synthetic resins for the manufacture of plastics without difficulties whereby the polymerization process is not impeded.

THE DESCRIPTION OF DETAILED EMBODIMENTS

According to the invention, the task is accomplished in that the compost being formed and a solvent are alternately or together introduced into a first heatable tank in the ratio 1:2 to 1:4 compost's solvent and are therein stirred from the start to the end of the introduction of a batch, followed by being kept in a tank for a period of time ranging from about 10 to about 16 hours for ripening and that after a certain depth of color, such as a light brown, has been reached, and the content of the tank has been heated to dryness thereby evaporating the solvent, the dried product is then available for a number of purposes.

The dried compost may be mixed in a second tank wherein it is mixed for a period of time with 2-3% by weight chlorinated paraffin and 1-3% antimony trioxide, based on the weight of the content of the tank, while being stirred and heated anew until dryness is again reached.

It is preferred that the solid or municipal waste be comprised of the following components:

|  | % by weight |
|---|---|
| water | about 30 to about 50% |
| organic substances | about 20 to about 40% |
| phosphorous | about 0.3 to about 0.9% |
| nitrogen | about 0.3 to about 0.9% |
| potassium | about 0.3 to about 0.6% |
| magnesium | about 0.3 to about 0.9% |
| calcium | about 0.6 to about 6.0% |

In carrying out the process of the invention, one obtains the fillers in form of fibers or granules which show the properties desired for fulfilling the task of the invention. Moreover, the fillers possess the following advantages: they are non-combustible, water-repellent, resistant to mold formation, resistant to many acids, mineral oils, low-boiling petroleum distillates, they are stable at temperatures up to 1200° C., unaffected by abrupt temperature changes, resistant to cold, sound-absorbing, insulating with respect to transfer of heat and electricity, and they readily polymerize. In addition, they possess a high filling capacity, i.e., considerable quantities of such fillers can be incorporated into a given quantity of resin.

Solvents which can be used are chlorinated aliphatic solvents of from one to four carbon atoms, such as carbon tetrachloride, trichloroethylene, ethylene chloride, methylene chloride, and the like, aliphatic ketones of from one to five carbon atoms, such as acetone, methyl ethyl ketone, butyl ketone, and the like, aliphatic ethers of one to four carbon atoms, such as dimethyl ether, diethyl ether, and the like, aromatic hydrocarbons, such as xylene, toluene, benzene, and the like, aliphatic alcohol of from one to six carbon atoms such as methanol, ethanol, butanol, propanol and the like, aliphatic esters such as alkyl ester of from one to five carbon atoms of saturated aliphatic acids of from one to four carbon atoms, such as ethyl acetate, butyl acetate, amyl acetate, "Cellosolve" (trademark of Union Carbide for ethylene glycol monoethyl ether), "Cellosolve" acetate, butyl "Cellosolve" acetate, ethyleneglycolmonomethyl ether, "Carbitol" (trademark of Union Carbide for diethylene glycol monoethyl ether), "Carbitol" acetate, butyl "Carbitol" acetate and the like, and other materials which likewise may be solvents for the system such as styrene, hydrogen peroxide and the like. These solvents may be used individually or may be mixed together, providing they do not form a reactive mixture.

The composition in which resins are added thereto with the fibrous or granular fillers according to the above invention may be processed to molded articles of various types, such as walls and slabs for exterior and interior construction, floors, furniture, sound-absorbing masses, laminated construction elements, linoleum-like materials, coating compositions (when the fillers have small grain size), and adhesives (because of the protein content of the fillers).

In addition, the fillers produced according to the invention described herein can be used with resins that are relatively hard originally but are made more elastic when used in the composition with the present invention.

The choice of the solvents described above depends upon the physical and chemical properties of the final product to be determined.

The present invention may also be used for the manufacture of boards, sealing compounds and coating masses, as well as rollable, flexible and elastic webs which may be fabricated. After the vessel containing the contents has been dried, synthetic resin or resin mixture may be added as well as castor oil, glycerol, a cobalt salt solution, a curing agent and an accelerator, and is applied to a suitable base support for the subsequent solidification of the mixture or is cast into molds. A mixture prepared according to this invention can be advantageously used as a sealing compound, for example switch cabinets containing sensitive measuring devices, casting of elastic fundaments, for example pumps, compressors and motors, whereby one can use the property of damping vibration shown by these masses after curing.

When the mixture is thus applied in sufficiently thin form, it becomes possible to manufacture sheets of continuous web which are rollable, flexible, elastic and which are suitable for linoleum-like floor coverings and even for road surfacing or upper layers of expressways. Molded articles of any dimension can be manufactured. The thus prepared end products are water-repellent, resistant to oil and gasoline, as well as to many acids and lyes. In addition they resist weathering, cold and changes in temperature. Their high abrasive resistance can also be emphasized. They can be machined, nailed, sawed, cut and permanently glued and jointed. These properties and other physical characteristics such as compressive strength, surface hardness, elastic behavior or flexibility can be adjusted by variation of the proportional distribution of the different individual substances.

Following the composting and process of the present invention, one can also obtain asbestos-like non-combustible materials from the solid waste. This can be achieved by separating the floury or fibrous constituents of the solid waste, mixing these fractions with an organic solvent for fats, waxes and oils in a mixing vessel while slowly being stirred, stirring is stopped after the filling is completed and the thus formed mixture is allowed to stand for about 2 hours; the stirring may be resumed and the mixture is heated until the boiling range of the solvent has been almost reached whereby the liquid constituents being present are distilled off. Thereafter the temperature is increased to about 105° C. while stirring is continued until complete drying of the intermediate product thus formed has been attained. In the second step, the dried product again has a solvent mixed thereto with additives being added which produce the desired physical and chemical final values one wishes to obtain. These additives are added with a stirring operation followed by letting the mixture thus formed stand for about two hours. Thereafter stirring is again resumed and the mixture is heated whereby the temperature is increased from 120° to 160° C. Next, the liquid is distilled off and the remaining material is completely dried, the heating and stirring is terminated and after some time has been allowed for storage, cold air is blown in for about five minutes and then the material has additional additives added thereto, such as a 3% chloroparaffin emulsion, based on the solvent employed, and this is conducted at a temperature of about 40° to 60° C. with additional stirring for approximately ten minutes. The material, obtained after the process described herein has been completed, is non-combustible, resistant to acids and water, water-repellent, and does not swell in contradictinction to asbestos. The acid resistance is higher than that of asbestos fiber. Even at temperatures of about 1400° C., there only occurs carbonization with weak generation of smoke. It is to be appreciated that an almost unlimited number of shades of the final product can be obtained merely by the addition of various pigments.

The materials prepared according to this process can be used for the same purposes as asbestos such as for incorporation into compositions serving for the manufacture of pipes, corrugated panels, doors in houses, facing panels, brake lining and the like.

While it is not essential that the solid waste of flours or fibers are purified during the first solvent operation, it is essential that the walls of the waste constituent are penetrated by the respective solvent. For this period of time it appears that at least two hours of mixing or standing or residence time is desired.

In the second stage, i.e., treatment of the dried compost product, various additives are included so that they may penetrate through the wall of the floury or fibrous material of the solid waste. The preferred additives are alkaline earth materials such as calcium carbonate, barium carbonate, various pigments such as organic or inorganic pigments, chlorinated hydrocarbons, all of which may be used individually or together.

It has also been determined that the above-identified method can be used for extracting filling materials from refuse which may be incorporated with natural and synthetic resins for producing stones, panels, pipes, prefabricated slabs or the like, and particularly for hydraulic engineering and hydro-economy from the resulting mixtures. This can be achieved by the addition of various other additives with the compost product attained, which additives are chalk, quartz, powder, dies, metal and the like.

The filling material produced according to the process of the present invention has a high filling rate, that is considerable quantities of such filling materials may be incorporated in a given quantity of resin, namely up to 60% filling material in the case of pressureless processing, and up to approximately 80% filling material with respect to the finished mixture when the latter is processed under pressure.

The choice of solvent will depend on the final product desired. For example, one may desire a fat free product. Alternatively, one may want polyesters in the final product and styrene is a good solvent for that purpose.

In the following examples all percentages are by weight and all temperatures are ° C., unless otherwise indicated.

EXAMPLE 1

Three parts by weight of dry compost and five parts by weight of styrene are introduced into the first heatable tank.

The dried compost has been obtained by grinding municipal waste, removing the iron particles, treating the waste with a solvent ranging in an amount of 1 : 2-4 parts compost : solvent, heating for a period of time ranging from about 10-16 hours and drying the product. The municipal waste contacted with the solvent is comprised of the following components:

|  | % by weight |
| --- | --- |
| water | about 30 to about 50% |
| organic substances | about 20 to about 40% |
| phosphorous | about 0.3 to about 0.9% |
| nitrogen | about 0.3 to about 0.9% |
| potassium | about 0.3 to about 0.6% |
| magnesium | about 0.3 to about 0.9% |
| calcium | about 0.6 to about 6.0% |

As soon as the total batch has been introduced, the heating and stirring is switched off. The time for ripening amounted to about 10–12 hours. As soon as a light brown color of the mass has been reached, one admixes 2% chlorinated paraffin and 3% antimony trioxide while stirring and further heating. Thereby, the temperature is increased by 100° C. within about 15 minutes.

In order to use the thus obtained filler for manufacturing, for example, a non-combustible slab to be placed on the exterior surface of the front of a building, one mixes the filler with a synthetic resin in the ratio of 60:30 weight and adds as well hardeners and accelerators, followed by casting or molding.

EXAMPLE 2

In the preparation of the dry compost of Example 1, one substitutes a solvent for fats, waxes and oils, such as 3 kg of ethylene glycol monoethyl ether acetate which is added to 1 kg of solid waste constituents; after the product is dried, one adds 3 kg carbon tetrachloride mixed with 0.01 to 0.02% by weight of aluminum powder and the product is dried again.

EXAMPLE 3

According to the process of Example 2, in the first operational step, 3 kg trichloroethylene is added to 1 kg of solid waste constituents; in the second operational step, one adds 3 kg carbon tetrachloride mixed with 0.3% by weight of carbon black and the product dried.

EXAMPLE 4

According to the process of Example 2, in the first operational step, one uses 3 kg methylene chloride mixed with 20% by weight of ethylene glycol monoethyl ether; in the second operational step, there are used 3 kg styrene mixed with 1% by weight of barium sulfate and the product dried.

The materials prepared according to Examples 2–4 are especially suited for incorporation into very differing binders, in particular, for incorporation into synthetic resins, for example, polyester resins.

The materials prepared according to Example 2 have proven themselves, especially in the manufacture of molded articles, for example, panels whereby the aluminum powder not only provides a pleasing metallic appearance, but also increases the flexibility.

In the case of Example 3, carbon black provides water-repellent properties and imparts an elastic effect; products which have been manufactured in this manner are especially suited for the processing to compositions which are destined for the manufacture of pipes, for example, for the construction of lines. The materials prepared according to Example 4 have proven to be particularly suited for the manufacture of purlins and the like since barium sulfate as a component provides good resistance to temperature changes and imparts water-repellent properties. It is emphasized that the materials prepared according to the invention can be present in floury form, granular form, or fibrous form (up to over 2 cm), especially in form of mixtures of the individual fractions which are available in the respective case.

EXAMPLE 5

| Parts by Weight (p.b.w.) | Components |
| --- | --- |
| 2,500 | Polyester Resin |
| 48 | Dimethylaniline |
| 28.8 | Castor Oil |
| 33.6 | Glycerol |
| 64 | Cobalt Salt Solution, 10% in Styrene |
| 250 | Titanium Dioxide |
| 450 | Compost prepared by the procedure of Example 1 |
| 285 | Benzoyl peroxide |

The above described components serve for the preparation of a mixture which can be cast into the form of tiles or larger boards. The height of application can be varied, depending each time upon the desired thickness of the tiles or the boards. The gelling time was about 8 minutes. The mass is cured after about 12 minutes. Its color is white because of the titanium dioxide, and its surface is glossy. Boards which are manufactured in this manner and which are relatively rigid can be sawed so that easy manual processing is guaranteed. Of course, a mixture thus prepared can also be used as a sealing compound, however, it is less suitable for purposes requiring elasticity as an important factor.

According to a further Example, a sealing compound can be manufactured which is elastic after the curing.

EXAMPLE 6

The formulation is essentially the same as that of Example 5, except that titanium dioxide is replaced with 150 p.b.w. of carbon black and that 40 p.b.w. of a plasticizer are added. The preferred plasticizer is an essential oil, for example, pine-needle oil. The mass gels after about 6 minutes and is cured after about 8–10 minutes. The color is black and the surface is glossy. After the curing, the mass is highly flexible and elastic.

The mass according to Example 6 as well as the mass according to Example 5 show excellent adhesion to concrete, cement, bitumen, and metals (even when these materials are badly corroded or varnished), and these masses also show excellent adhesion to wood, glass, automobile tires, etc. When the masses are cast into molds or into sliding supports (for the manufacture of continuous webs) they show the additional advantage of a free surface which is turned to the atmosphere and possesses high adhesive power after the curing so that, for example, floor tiles and wall tiles can be manufactured without special precautionary measures and without any special expenditure, so-to-speak automatically, which tiles can be adhesively attached to a support, for example, a wall or a floor.

In the case of roadways, streets, and expressways, this one-sided adhesive power has the advantage in that even larger areas which need repair can be made safe for driving quickly and easily by webs which can be unrolled. Webs of any width and thickness can be manufactured, for instance, those having a width of about 4m and a thickness of about 10mm, and such webs can be wound up and transported as wound-up rolls. Potholes and other depressions in the pavement to be repaired are graded beforehand.

The following Example deals with the manufacture of such a rollable, flexible, and elastic web which is suitable for application to roadways, for example, expressways. For purposes of demonstration, a flexible surfacing of about 2m² area and about 7mm thickness is manufactured which has been cast into a mold and for which a black color is chosen.

EXAMPLE 7

Tichtly packed corundum or quartz sand is strewn on the bottom of the mold until a height of about 2–3mm has been reached. The first layer cast on this bed is a mixture having the following composition:

| Parts by Weight (p.b.w.) | Components |
| --- | --- |
| 45 | Synthetic Resin (Polyester) |
| 0.2 | Cobalt Salt Solution in Styrene |
| 0.2 | Castor Oil |
| 0.1 | Glycerol |
| 1 | Dimethylaniline |
| 3 | Benzoyl Peroxide |
| 4 | Chloroparaffin Solution |
| 2 | Antimony (III) Oxide |
| 1.5 | Plasticizer (Essential Oil) |
| 10 | Quartz Powder Ground as Fine as Possible |
| 20 | Dry Compost prepared by procedure of Example 1 |
| 0.5–1 | Carbon Black |

The first layer has a thickness of about 4mm; the gelling time is about 4–6 minutes. After about four minutes there is cast on this first layer a second layer which is a mixture consisting of the following components:

| Parts by Weight (p.b.w.) | Components |
| --- | --- |
| 45 | Polyester |
| 0.2 | Castor Oil |
| 0.1 | Glycerol |
| 1 | Dimethylaniline |
| 3 | Benzoyl Peroxide |
| 1.5 | Plasticizer (Essential Oil) |
| 30 | Dry Compost prepared by procedure of Example 1 |
| 5 | Titanium Dioxide |
| 4 | Chloroparaffin Solution |
| 2 | Antimony (III) Oxide |

The gelling time is about 4–6 minutes, and the resulting total thickness is about 8–10mm. The color of this second layer is white; the surface of this layer has strong adhesive power. For storage and transportation, the adhesive side is provided with a removable sheet of silicon paper or the like.

It is to be understood that such road surfacings can be directly manufactured, i.e., the sealing compounds manufactured according to the invention can be directly applied to the roadway to be repaired or to be provided with surfacing and they can be flattened before the gelling and the subsequent curing occur whereby, of course, the layers are applied in reverse sequence. Thus, the masses manufactured according to the invention can be worked up in a manner similar to that used at present for the application of road surfacings based on bitumen. As to the above-quoted possibility of the beforehand manufacture of webs which can be subsequently applied to prepared and flattened surfaces, this possibility is, of course, especially time-saving and advantageous. Thus, the hitherto used construction times can be shortened considerably.

It may be advantageous to take care that the dry modified compost is non-combustible. This can be achieved in the following manner. Before the dried modified compost is mixed with the further components, such as for example, a curable synthetic resin, it is transferred to a second vessel and mixed therein with 2–3% by weight of antimony (III) oxide for about 3 minutes while being stirred and further heated until it is again dry. In all cases in which the finished product, for example, the linoleum-like material according to Example 5 is to be rendered especially flame-resistant, one preferably adds to the above-given formulation a chloroparaffin solution and antimony (III) oxide, in particular, 4 parts by weight of chloroparaffin solution and 2 parts by weight of antimony (III) oxide. The same applies to the formulation according to Example 6. In Example 7, these components and their parts by weight have been already listed.

The expression "chloroparaffin solution" always designates liquid chlorinated paraffin hydrocarbons having a chlorine content between 30% and 70%, preferably 50%.

The cobalt salt solution mainly refers to a cobalt octoate solution, more specifically, to a 10% solution in styrene.

The following additional Example concerns a sealing compound which is especially suitable for the embedding in concrete of foundations, of supports, railings, or the like.

EXAMPLE 8

| Parts by Weight (p.b.w.) | Components |
| --- | --- |
| 40 | Polyester Resin |
| 30 | Dry Compost prepared by procedure of Example 1 |
| 2 | Carbon Black |
| 1.5 | Plasticizer |
| 1.5 | Paraffin |
| 3 | Dimethylaniline |
| 1.5 | Benzoyl Peroxide |
| 0.2 | Castor Oil |
| 0.1 | Glycerol |

Fine quartz sand can be used for strewing on the surface or covering the surface of the cast sealing compound after the surface has been smoothed. The gelling time is about 8 minutes, the curing time is about 12–15 minutes. These values are valid for a normal temperature of 20° C. and a relative atmospheric moisture of 65%. The curing is slower in the evening and in the morning.

In Examples 5–8, benzoyl peroxide was named as curing agent and dimethylaniline as accelerator. It should be pointed out that other curing agents and accelerators known to the expert can likewise be used in certain cases. Moreover, an essential oil, advantageously pine-needle oil, can be used as plasticizer in Example 8.

Examples of the production of a filling material using the materials produced by the process of the present invention is given hereafter.

EXAMPLE 9

Three parts by weight compost of the composition given in Example 1, and five parts by weight carbon tetrachloride are introduced into a first container which may be heated to approximately 70° C. and stirred. The introduction takes place very slowly, over at least 45 minutes, in order to prevent the formation of a paste. As soon as the entire batch has been introduced, the heating and agitation are stopped. The subsequent maturing time lasts approximately 10 to 12 hours. As soon as the material reaches a midbrown color, the addition of 2% chloro-paraffin and 3% antimony trioxide takes place with stirring and further heating. The mixture is then heated to 100° C. for approximately 30 minutes.

The second part of the object is fulfilled in that the filling material obtained for the polyester resin, quartz powder of varied grain size, a plasticizer, an accelerator, a hardener castor oil, glycerine, liquid paraffin and cobalt octoate solution are mixed together and then placed in molds, in which the mixture may harden. According to a preferred embodiment for producing stones and panels, approximately 500 parts by weight filler prepared as above
approximately 100 parts by weight quarts powder
approximately 300 parts by weight polyester resin
approximately 20 parts by weight volatile oil in a 20% alcohol solution as plasticizer
approximately 40 parts by weight benzoyl peroxide or similar hardeners with traces of fat-free aluminium powder as a hardener
approximately 10 parts by weight dimethyl aniline or other tertiary amines as an accelerator
approximately 2.5 parts by weight castor oil
approximately 1.5 parts by weight glycerine
approximately 1.6 parts by weight liquid paraffin with a boiling point of 53°-56° C.
approximately 2 parts by weight 10% cobalt octoate solution in styrol are mixed together.

After being stored for 18 months in a salt water solution with a salt content of approximately 4%, a test sample in the form of a block having dimensions of 15cm × 15cm × 40cm showed no weight loss, no deformation, no swelling and no change of its grey coloring.

EXAMPLE 10

According to another embodiment, the filling material prepared according to Example 9 and polyester resin, quartz powder of various grain sizes, plasticizer, liquid chloro-paraffin, antimony trioxide, carbon tetrachloride, carbon black, hardener and accelerator were mixed together and placed in molds, in which the mixture can harden. A mixture of approximately 500 parts by weight filler
approximately 100 parts by weight quartz powder
approximately 300 parts by weight polyester resin
approximately 15 parts by weight volatile oil as plasticizer
approximately 16 parts by weight liquid chloroparaffin
approximately 8 parts by weight antimony trioxide
approximately 10 parts by weight carbon tetrachloride.
approximately 8 parts by weight carbon black
approximately 35 parts by weight benzoyl peroxide or similar hardener
and approximately 7.2 parts by weight dimethyl aniline or other tertiary amines as an accelerator, has thus proved particularly successful. One thus obtains a non-combustible stone material for building reservoirs and port installations, whose temperature resistance in an open flame amounts to approximately 1200° C.

EXAMPLE 11

According to another embodiment, the filler prepared according to Example 9 and quartz powder of varying grain sizes, polyester resin, plasticizer, glass fibres of approximately 2cm in length, antimony trioxide, liquid chloro-paraffin, carbon tetrachloride, hardeners, accelerators and an organic coloring material are mixed together and then placed in molds, where the mixture may harden. A mixture of approximately 500 parts by weight filler
approximately 100 parts by weight quartz powder
approximately 300 parts by weight polyester resin
approximately 20 parts by weight volatile oil as plasticizer
approximately 100 parts by weight glass fibres
approximately 8 parts by weight antimony trioxide
approximately 16 parts by weight chloro-paraffin
approximately 30 parts by weight carbon tetrachloride
approximately 40 parts by weight benzoyl peroxide or similar hardener
approximately 10 parts by weight tertiary amines, for example dimethyl aniline as an accelerator
approximately 15 parts by weight fat-free aliminium powder is particularly preferred, resulting in a non-combustible silvery shaped member. This material is particularly suitable for ship-building panels, planks, and buoys.

What is claimed is:

1. A process for producing a compost which comprises grounding municipal waste, magnetically freeing from iron contained therein, separating said mixture into components of various sizes by fractionation and, treating said mixture in a tank in a fermentation process at a temperature of about 65° C. by continuously passing air thereto and mixing a solvent with said mixture and heating said tank until the contents of the tank are dried, thereby forming a compost.

2. The process of claim 1 wherein the municipal waste is comprised of:

|  | % by weight |
|---|---|
| water | about 30 to about 50% |
| organic substances | about 20 to about 40% |
| phosphorous | about 0.3 to about 0.9% |
| nitrogen | about 0.3 to about 0.9% |
| potassium | about 0.3 to about 0.6% |
| magnesium | about 0.3 to about 0.9% |
| calcium | about 0.6 to about 6.0% |

3. The process of claim 2 wherein the solvent: waste is mixed in a ratio of about 1:2 to about 4 parts by weight waste:solvent.

4. The process of claim 1 further comprising mixing the dry compost with synthetic resin.

5. The process of claim 1 wherein the solvent is selected from the group consisting of chlorinated aliphatic solvents of from one to four carbon atoms, aliphatic ketones of from one to five carbon atoms, aliphatic ethers, aromatic hydrocarbons, aliphatic alcohols of from one to six carbon atoms, aliphatic esters, styrene, hydrogen peroxide and mixtures thereof.

6. The process of claim 1 further comprising mixing the compost with a curing synthetic resin, castor oil, glycerol, cobalt salt solution, curing agent and accelerator.

7. The process of claim 6 wherein polyester resin is the synthetic resin, benzoyl peroxide is the curing agent, and dimethyl aniline is the accelerator.

8. A process for producing non-combustible compost useful as stone material for the building of reservoirs and port installations according to the process of claim 1 further comprising mixing together 500 parts by weight of compost, approximately 100 parts by weight quartz powder, approximately 300 parts by weight polyester resin as a plasticizer, approximately 20 parts by weight pine or spruce needle extract in a 20% alcohol solution, as a hardener, approximately 40 parts by weight benzoyl peroxide with traces of aluminum powder as an accelerator, approximately 10 parts by weight dimethyl aniline, approximately 2.5 parts by weight castor oil, approximately 1.5 parts by weight glycerine, approximately 1.6 parts by weight liquid paraffin with a boiling point of 52°–56° C. and approximately 2 parts by weight 10% cobalt octoate solution in styrol.

9. The process of claim 1 wherein before treating said mixture in a fermentation process sewage sludge or water is added and the treatment at a temperature of about 65° C. is for about 24 hours.

10. The process of claim 1 wherein the dried compost is introduced in a second tank in which it is mixed with 2–3% by weight of chloroparaffin solution and 1–3% by weight of antimony (III) oxide while being stirred and further heated to renewed dryness.

11. A process for producing a compost characterized by being non-combustible fibrous materials according to the process of claim 1 wherein the solvent is a solvent for fats, waxes and oils and said solvent:waste mixture is dried to a first residue;

forming a second mixture of solvent and said first residue;

adding materials selected from the group consisting of aluminum powder, copper powder, silver-, gold- and brass-bronzes, amorphous forms of silicon compounds, calcium carbonate, barium compounds, organic and inorganic pigments, chlorinated hydrocarbons, or mixtures thereof; and drying said product to produce a second residue.

12. The process of claim 11 further comprising adding a 3% chloro-paraffin emulsion based on the weight of the solvent therefore, to the dried second residue.

13. The process of claim 11 wherein the second residue solvent mixture is comprised of 3 kg of carbon tetrachloride mixed with 0.01–0.02% by weight of aluminum powder wherein the waste:solvent is mixed in a ratio of about 1:2 to about four parts by weight waste:solvent.

14. The process of claim 11 wherein the second residue solvent mixture is comprised of a mixture of 3 kg of carbon tetrachloride mixed with 0.3% by weight of carbon black wherein the waste:solvent is mixed in a ratio of about 1:2 to about four parts by weight waste:solvent.

15. The process of claim 11 wherein the second residue solvent mixture is comprised of a mixture of 3 kg styrene mixed with 1% by weight of barium sulfate wherein the waste:solvent is mixed in a ratio of about 1:2 to about four parts by weight waste:solvent.

* * * * *